US008680161B2

(12) United States Patent
Hitzfeld et al.

(10) Patent No.: US 8,680,161 B2
(45) Date of Patent: Mar. 25, 2014

(54) COMPOSITIONS OF FAT-SOLUBLE ACTIVE INGREDIENTS CONTAINING GUM GHATTI

(75) Inventors: Andrea Hitzfeld, Rheinfelden (DE); Bruno H. Leuenberger, Rheinfelden (DE); Olivia Vidoni, Saint Louis (FR)

(73) Assignee: DSM IP Assets B.V., Heerlen (NL)

( * ) Notice: Subject to any disclaimer, the term of this patent is extended or adjusted under 35 U.S.C. 154(b) by 398 days.

(21) Appl. No.: 12/995,836

(22) PCT Filed: Jun. 3, 2009

(86) PCT No.: PCT/EP2009/056771
§ 371 (c)(1), (2), (4) Date: Dec. 2, 2010

(87) PCT Pub. No.: WO2009/147158
PCT Pub. Date: Dec. 10, 2009

(65) Prior Publication Data
US 2011/0081330 A1    Apr. 7, 2011

(30) Foreign Application Priority Data

Jun. 3, 2008    (EP) .................................... 08010107

(51) Int. Cl.
*A61K 31/07* (2006.01)
*A23L 1/303* (2006.01)

(52) U.S. Cl.
USPC ............ 514/782; 424/485; 514/725; 426/648

(58) Field of Classification Search
USPC .................... 514/782, 725; 424/485; 426/648
See application file for complete search history.

(56) References Cited

U.S. PATENT DOCUMENTS 2,897,119 A * 7/1959 Dunn ........................... 424/489
2005/0287221 A1   12/2005 DeBrouse
2008/0102131 A1    5/2008 Nagira et al.

FOREIGN PATENT DOCUMENTS

JP         07102279 A    *  4/1995
WO    WO 99/07238           2/1999

OTHER PUBLICATIONS

National Library of Medicine, Medical Subject Headings, MeSH descriptor data, entry for oligosaccharides, http://www.nlm.nih.gov/cgi/mesh/2011/MB_cgi?mode=&term=Oligosaccharides, 1999.*
National Library of Medicine, Medical Subject Headings, MeSH descriptor data, entry for disaccharides, http://www.nlm.nih.gov/cgi/mesh/2011/MB_cgi?mode=&term=DISACCHARIDES, 1999.*
English translation of JP 07-102279 A, Sanei Gen FII Inc., 1995, translated Jun. 2013.*
Kostic et al., "Intestinal absorption, serum clearance and interactions between lutein and beta-carotene when administered to human adults in separate or combine oral doses," Am J Clin Nutr 62:604-610, 1995.*
BASF, Lucarotin® 30 M, beta-carotene dispersion in corn oil, technical bulletin, http://www.basf.com.mx/humannutrition/pdfs/HNCAR_55_090805.pdf, 2005, printed on Jun. 11, 2013.*
International Search Report for PCT/EP2009/056771, filed Feb. 12, 2010.

* cited by examiner

*Primary Examiner* — Rosanne Kosson
(74) *Attorney, Agent, or Firm* — Nixon & Vanderhye P.C.

(57) ABSTRACT

The present invention relates to compositions containing plant gums and one or more fat-soluble active ingredients, wherein the composition comprises less than 40 weight-% oil, based on the total composition in dry matter. These compositions can be used for the enrichment, fortification and/or coloration of food beverages, animal feed, cosmetics or pharmaceutical compositions. The present invention also refers to the preparation of such compositions. The present invention furthermore refers to a process for the manufacture of a beverage by mixing the compositions with ingredients of beverages. The present invention also refers to beverages obtainable by this process.

21 Claims, No Drawings

COMPOSITIONS OF FAT-SOLUBLE ACTIVE INGREDIENTS CONTAINING GUM GHATTI

This application is the U.S. national phase of International Application No. PCT/EP2009/056771 filed 3 Jun. 2009, which designated the U.S. and claims priority to EP Application No. 08010107.4 filed 3 Jun. 2008, the entire contents of each of which are hereby incorporated by reference.

FIELD

The present invention relates to compositions containing plant gums and one or more fat-soluble active ingredients, wherein the composition comprises less than 40 weight-% oil, based on the total composition in dry matter. These compositions can be used for the enrichment, fortification and/or coloration of food beverages, animal feed, cosmetics or pharmaceutical compositions. The present invention also refers to the preparation of such compositions. The present invention furthermore refers to a process for the manufacture of a beverage by mixing the compositions with ingredients of beverages. The present invention also refers to beverages obtainable by this process.

BACKGROUND

Compositions to enrich, fortify or color food, beverages, animal feed, cosmetics or pharmaceutical compositions which contain fat-soluble active ingredients, for example beta-carotene, are known in the art. Beta-Carotene is a preferable colorant compound due to its intense and for the above-mentioned applications very pleasing orange color. Since the final compositions are usually aqueous compositions such as beverages, additional compounds have to be added to compositions for the enrichment, fortification and/or coloration to avoid separation of fat (oil) phases from the product, which would render the corresponding product unacceptable.

Therefore, fat-soluble active ingredients are often combined with auxiliary compounds such as starches or fish gelatin, in order to prevent phase separation in the final aqueous composition. Those auxiliary compounds, however, often have a negative influence on the color properties and the nutritional properties of the final products. It is therefore desired to develop new compositions of fat-soluble active ingredients, which contain improved auxiliary compounds, which have very good properties referring to taste, emulsification, emulsion stability, film forming ability and/or color of the composition.

Gum ghatti, otherwise known as the Indian gum or Axlewood, is obtained as exudate from *Anogessias latifolia*, tree belonging to the Combretaceae family. It is a complex polysaccharide with L-arabinose, D-galactose, D-mannose, D-xylose, and D-glucorinic acid. Gum ghatti may contain up to 5% or even more proteins. It is used for encapsulation of flavours or oils, as fibre source, film forming agent, adhesive etc.

US2003/0021874A1 discloses compositions used for stabilizing non-milk, acidic beverages. The pillar of all the compositions described in this application patent consists on a specific amount of a stabilizer system consisting either of pectin or alginate. Gums may be used additionally as stabilizers in case the compositions also contain clouding agents. In contrast to this patent application (US2003/0021874A1), the compositions according to the present invention do not contain stabilizers like pectin or alginate.

US2005/0287221A1 discloses a composition with gums and/or gum resins and active substances and their converting into dried forms. As disclosed therein, the disclosed active beadlets consists of encapsulated pharmaceuticals. These bioactive substances are for oral delivery to the small intestinal of mammal.

The compositions according to the present invention differ significantly from the compositions disclosed in US2005/0287221A1.

In coloring products, such as beverages, it is also often desirable to preserve the optical clarity of the beverage. Fat-soluble colorants, such as carotenoids, e.g. beta-carotene, for supplementation are available in many forms, but when added to beverages, will tend to increase the visible turbidity. Ringing, i.e. the formation of a separate fat-soluble beta-carotene layer on the top of the liquid is also a problem of many known beta-carotene formulations. One means of adding fat-soluble substances to beverages without increasing visible turbidity or ringing is to encapsulate the substances in liposomes. However, this is a costly process, and the concentration of substance in the liposome tends to be low.

A satisfactory composition of a fat-soluble colorant, such as carotenoids, which can be added to beverages in a restorative or nutritionally supplemental amount, should thus not affect the optical clarity of the beverage and not alter the sensory properties of the beverage to which it is added and furthermore it should not cause ringing.

SUMMARY

Therefore, there is still a need for compositions of fat-soluble active ingredients for the enrichment, fortification and/or coloration of food, beverages, animal feed, cosmetics or pharmaceutical compositions which do not show the above-mentioned problems, i.e. which do not show separation phenomena. In case the fat-soluble active ingredient is a colorant the composition should furthermore provide increased color intensity and color stability of the resulting product.

It was therefore an object of the present invention to provide compositions of fat-soluble active ingredients having the desired properties as indicated above, e.g. very good properties referring to optical clarity and emulsion stability and/or an improved color intensity and color stability (wherever applicable). It was also an object of the invention to improve the process for the preparation of compositions of fat-soluble active ingredients for example by using different emulsification techniques.

This objective has been solved by the compositions according to the present invention.

The present invention relates to a composition comprising gum ghatti and one or more fat-soluble active ingredients, wherein the composition comprises less than 40 weight-% oil, further preferred less than 35 weight-% oil, further preferred less than 30 weight-% oil, based on the total composition in dry matter. It is most preferred if the composition according to the invention comprises from 0 to 10 weight-% oil.

In a preferred embodiment of the invention, the composition comprises between 20 and 85 weight-%, further preferred between 30 and 65 weight-% of gum ghatti, based on the total composition in dry matter.

DETAILED DESCRIPTION

As used herein, the term "fat-soluble active ingredient" refers to vitamins selected from the group consisting of vitamin A, D, E, K and derivatives thereof; polyunsaturated fatty acids; lipophilic health ingredients; carotenoids; and flavoring or aroma substances as well as mixtures thereof.

Polyunsaturated fatty acids (PUFAs), which are suitable according to the present invention, are mono- or polyunsaturated carboxylic acids having preferably 16 to 24 carbon atoms and, in particular, 1 to 6 double bonds, preferably having 4 or 5 or 6 double bonds.

The unsaturated fatty acids can belong both to the n-6 series and to the n-3 series. Preferred examples of n-3 polyunsaturated acids are eicosapenta-5,8,11,14,17-enoic acid and docosahexa-4,7,10,13,16,19-enoic acid; preferred examples of a n-6 polyunsaturated acid are arachidonic acid and gamma linolenic acid.

Preferred derivatives of the polyunsaturated fatty acids are their esters, for example glycerides and, in particular, triglycerides; particularly preferably the ethyl esters. Triglycerides of n-3 and n-6 polyunsaturated fatty acids are especially preferred.

The triglycerides can contain 3 uniform unsaturated fatty acids or 2 or 3 different unsaturated fatty acids. They may also partly contain saturated fatty acids.

When the derivatives are triglycerides, normally three different n-3 polyunsaturated fatty acids are esterified with glycerin. In one preferred embodiment of the present invention triglycerides are used, whereby 30% of the fatty acid part are n-3 fatty acids and of these 25% are long-chain polyunsaturated fatty acids. In a further preferred embodiment commercially available ROPUFA® '30' n-3 Food Oil (DSM Nutritional Products Ltd, Kaiseraugst, Switzerland) is used.

In another preferred embodiment of the present invention, the PUFA ester is ROPUFA® '75' n-3 EE. ROPUFA '75' n-3 EE is refined marine oil in form of an ethyl ester with minimum content of 72% n-3 fatty acid ethyl ester. It is stabilized with mixed tocopherols, ascorbyl palmitate, citric acid and contains rosemary extract.

In another preferred embodiment of the present invention the PUFA ester is ROPUFA® '10' n-6 Oil, a refined evening primrose oil with minimum 9% gamma linolenic acid which is stabilized DL-alpha-tocopherol and ascorbyl palmitate.

According to the present invention it can be advantageous to use naturally occurring oils (one ore more components) containing triglycerides of polyunsaturated fatty acids, for example marine oils (fish oils) and/or plant oils, but also oils extracted from fermented biomass or genetically modified plants Preferred oils which comprise triglycerides of polyunsaturated fatty acids are olive oil, sunflower seed oil, evening primrose seed oil, borage oil, grape seed oil, soybean oil, groundnut oil, wheat germ oil, pumpkin seed oil, walnut oil, sesame seed oil, rapeseed oil (canola), blackcurrant seed oil, kiwifruit seed oil, oil from specific fungi and fish oils.

Preferred examples for polyunsaturated fatty acids are e.g. linoleic acid, linolenic acid, arachidonic acid, docosahexaenic acid, eicosapentaenic acid and the like.

According to the present invention preferred lipophilic health ingredients are resveratrol; ligusticum; ubichinones and/or ubiquinols (one or more components) selected from coenzyme Q 10 (also referred to as "CoQ10"), coenzyme Q 9, and/or their reduced forms (the corresponding ubiquinols); genistein and/or alpha-lipoic acid.

Especially preferred fat-soluble active ingredients of the invention are carotenoids, especially beta-carotene, lycopene, lutein, bixin, astaxanthin, apocarotenal, beta-apo-8'-carotenal, beta-apo-12'-carotenal, canthaxanthin, cryptoxanthin, citranaxanthin and zeaxanthin. Most preferred is beta-carotene.

In an preferred embodiment of the invention, the composition comprises between 0.1 and 70 weight-%, further preferred between 0.1 and 30 weight-%, further preferred between 0.5 and 20 weight-%, most preferred between 0.5 and 15 weight-% of one or more fat-soluble active ingredients, based on the total composition in dry matter.

The expression "oil" as used in this context comprises any triglycerides or any other oil (e.g. terpene), which is suitable for the desired use of the composition. The oil is preferably a vegetable oil or fat, preferably corn oil, sunflower oil, soybean oil, safflower oil, rapeseed oil, peanut oil, palm oil, palm kernel oil, cotton seed oil, orange oil, limonene, olive oil or coconut oil.

In a further preferred embodiment of the invention, the composition is characterized in that it further comprises at least one additional plant gum; especially preferred the further plant gum is gum acacia. The gum acacia used in the compositions according to the invention is *Acacia senegal* or *Acacia seyal*, preferably *Acacia Seyal*.

If the composition according to the invention further comprises at least one additional plant gum, it is preferred if it further comprises at least one modified starch.

The term "modified food starch" as used herein relates to modified starches that are made from starches substituted by known chemical methods with hydrophobic moieties. For example starch may be treated with cyclic dicarboxylic acid anhydrides such as succinic and/or glutaric anhydrides, substituted with an alkyl or alkenyl hydrocarbon group.

A particularly preferred modified starch of this invention has the following formula (I)

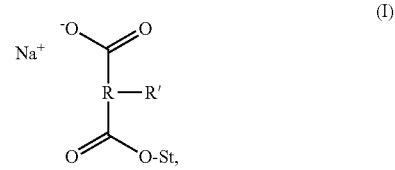

Wherein St is a starch, R is an alkylene radical and R' is a hydrophobic group. Preferably R is a lower alkylene radical such as dimethylene or trimethylene. R' may be an alkyl or alkenyl group, preferably having 5 to 18 carbon atoms. A preferred modified starch of formula (I) is starch sodium octenyl succinate ("OSA-starch"). The term "OSA-starch" as used herein denotes any starch (from any natural source such as corn, wheat, tapioca, potatoe or synthesized) that was treated with octenyl succinic anhydride (OSA). The degree of substitution, i.e. the number of esterified hydroxyl groups with regard to the total number of hydroxyl groups usually varies in a range of from 0.1% to 10%, preferably in a range of from 0.5% to 5%, more preferably in a range of from 2% to 4%.

OSA-starches may contain further hydrocolloids, such as starch, maltodextrin, carbohydrates, gum, corn syrup etc. and optionally any typical emulsifier (as co-emulgator), such as mono- and diglycerides of fatty acids, polyglycerol esters of fatty acids, lecithins, sorbitan monostearate, plant fiber and/or sugar.

OSA-starches are commercially available e.g. from National Starch under the trade names HiCap 100, Capsul, Capsul HS, Purity Gum 2000, UNI-PURE, HYLON VII; from Roquette Frères; from CereStar under the tradename C*EmCap or from Tate & Lyle. HiCap 100 is especially preferred.

If the composition according to the invention further comprises at least one additional plant gum, it is furthermore preferred if it additionally comprises one or more oligosaccharides, such as dextrins and maltodextrins, especially those having the range of 5 to 65 dextrose equivalents (DE), and glucose syrup, especially such having the range of 20 to 95 DE. The term "dextrose equivalent" (DE) denotes the degree of hydrolysis and is a measure of the amount of reducing sugar calculated as D-glucose based on dry weight; the scale is based on native starch having a DE close to 0 and glucose having a DE of 100. Preferably, maltodextrin is used in the composition according to the invention.

The invention also relates to a process for the manufacture of a composition as indicated above comprises the following steps (the process can be carried out using the ingredients in amounts as specified herein):

I) dissolving gum ghatti and optionally one or more additional plant gums in water,
II) optionally adding at least one modified starch to the solution of step I),
III) adding the organic phase, comprising one or more fat-soluble active ingredients and less than 40 weight-% oil (based on the total composition in dry matter) and—in case the fat-soluble active ingredient is a carotenoid—further comprising an organic solvent and to the solution of step II)
IV) emulsifiying the mixture of step III) at a temperature of between 30° C. and 100° C., further preferred between 45° C. and 80° C., further preferred between 50° C. and 70° C.
V) evaporating the organic solvent under reduced pressure.
VI) drying the emulsion by spray-drying, powder catch or other processes The drying step may be carried out with any conventional drying process known to the person skilled in the art, preferred are spray drying and/or a powder catch process where sprayed suspension droplets are caught in a bed of an adsorbant such as starch or calcium silicate or silicic acid or calcium carbonate or mixtures thereof and subsequently dried.

It is further preferred that—if desired—the oligosaccharides, preferably maltodextrin, are added in step II) of the process.

Suitable organic solvents are halogenated aliphatic hydrocarbons, aliphatic ethers, aliphatic and cyclic carbonates, aliphatic esters and cyclic esters (lactones), aliphatic and cyclic ketones, aliphatic alcohols and mixtures thereof.

Examples of halogenated aliphatic hydrocarbons are mono- or polyhalogenated linear, branched or cyclic $C_1$- to $C_{15}$-alkanes. Especially preferred examples are mono- or polychlorinated or -brominated linear, branched or cyclic $C_1$- to $C_{15}$-alkanes. Preferably $CHCl_3$ is used.

Examples of aliphatic esters and cyclic esters (lactones) are ethyl acetate, isopropyl acetate and n-butyl acetate; and γ-butyrolactone.

Examples of aliphatic and cyclic ketones are acetone, diethyl ketone and isobutyl methyl ketone; and cyclopentanone and isophorone.

Examples of cyclic carbonates are especially ethylene carbonate and propylene carbonate and mixtures thereof.

Examples of aliphatic ethers are dialkyl ethers, where the alkyl moiety has 1 to 4 carbon atoms. One preferred example is dimethyl ether.

Examples of aliphatic alcohols are ethanol, iso-propanol, propanol and butanol.

The invention also relates to the use of a composition as indicated above for the enrichment, fortification and/or coloration of food, beverages, animal feed, cosmetics or pharmaceutical compositions.

The invention also relates to a process for the manufacture of a beverage by mixing a composition as indicated above with further usual ingredients of beverages.

The invention also relates to a beverage obtainable by the process as indicated above.

It has surprisingly been found that the compositions of the present invention can be mixed with water, whereby the resulting mixture has high stability. Further, no separation of the fat-soluble active ingredient(s) from the resulting mixture is obtained. If the fat-soluble active ingredient is beta-carotene the advantageous color is achieved without the presence of auxiliary compounds such as fish gel or coloring compounds beside beta-carotene.

It was furthermore unexpectedly found that the compositions according to the present invention have improved properties, e.g. color intensity and color stability, when using small amounts oil (e.g. down to 1 weight-%).

If not defined to the contrary, the amount (weight-%) of a compound of the composition refers to the weight-% of this compound based on the total composition in dry matter (total amount of all ingredients without any solvents like organic solvents and/or water). The compositions according to the invention are preferably emulsions.

Solid compositions may in addition contain an anti-caking agent, such as silicic acid or tricalcium phosphate and the like, and up to 10 weight-%, preferably 0.1 to 5 weight-%.

The water-soluble antioxidant may be for example ascorbic acid or a salt thereof, preferably sodium ascorbate, water-soluble polyphenols such as hydroxy tyrocol and oleuropein, aglycon, epigallo catechin gallate (EGCG) or extracts of rosemary or olives.

The fat-soluble antioxidant may be for example a tocopherol, e.g. dl-α-tocopherol (i.e. synthetic tocopherol), d-α-tocopherol (i.e. natural tocopherol), β- or γ-tocopherol, or a mixture of two or more of these; butylated hydroxytoluene (BHT); butylated hydroxyanisole (BHA); ethoxyquin, propyl gallate; tert. butyl hydroxyquinoline; or 6-ethoxy-1,2-dihydroxy-2,2,4-trimethylquinoline (EMQ), or an ascorbic acid ester of a fatty acid, preferably ascorbyl palmitate or stearate.

Additionally, the composition can comprise water.

Preferably, the compositions of the present invention do not contain further coloring substances except a carotenoid compound. Preferably, the compositions of the present invention do not contain fish gelatin.

Table 1 shows the preferred amounts (weight-%) of preferred ingredients of the composition, based on the total composition in dry matter. The amounts specified in table 1 can additionally be combined with the preferred amounts for the ingredients as specified above.

TABLE 1

| Ingredient | Amount |
| --- | --- |
| fat-soluble active ingredients, preferably carotenoids, especially beta-carotene | 0.1 to 70 weight-%, preferably 1 to 30 weight-%, preferably 1 to 20 weight-%, preferably 0.5 to 15 weight-%; |
| gum ghatti | 5 to 85 weight-%, preferably 10 to 65 weight-%; |
| gum *acacia* | 20 to 85 weight-%, preferably 30 to 65 weight-%; |
| modified starch | 0 to 20 weight-%, preferably 5 to 15 weight-% |
| one or more saccharide(s), preferably maltodextrin | 0 to 20 weight-%, preferably 5 to 15 weight-% |
| one or more oil(s) and/or triglyceride(s) | 0 to 40 weight-%, preferably 0 to 10 weight-%; |

TABLE 1-continued

| Ingredient | Amount |
| --- | --- |
| one or more fat-soluble antioxidant(s) | 0 to 5 weight-%, preferably 0 to 2 weight-% |
| anti-caking agent | 0.1 to 5 weight-% |

The present invention is also directed to the use of compositions as described above for the enrichment, fortification and/or coloration of food, beverages, animal feed, cosmetics or pharmaceutical compositions, preferably for the enrichment, fortification and/or coloration of beverages. There is no "ringing", i.e. the undesirable separation of insoluble parts at the surface of bottles filled with beverages containing the compositions of the present invention.

Other aspects of the invention are food, beverages, animal feed, cosmetics and pharmaceutical compositions containing a composition as described above.

Beverages wherein the product forms of the present invention can be used as a colorant or an additive ingredient can be carbonated beverages e.g., flavored seltzer waters, soft drinks or mineral drinks, as well as non-carbonated beverages e.g. flavored waters, fruit juices, fruit punches and concentrated forms of these beverages. They may be based on natural fruit or vegetable juices or on artificial flavors. Also included are alcoholic beverages and instant beverage powders. Besides, sugar containing beverages diet beverages with non-caloric and artificial sweeteners are also included.

Further, dairy products, obtained from natural sources or synthetic, are within the scope of the food products wherein the product forms of the present invention can be used as a colorant or as an additive ingredient. Typical examples of such products are milk drinks, ice cream, cheese, yogurt and the like. Milk replacing products such as soymilk drinks and tofu products are also comprised within this range of application.

Also included are sweets which contain the product forms of the present invention as a colorant or as an additive ingredient, such as confectionery products, candies, gums, desserts, e.g. ice cream, jellies, puddings, instant pudding powders and the like.

Also included are cereals, snacks, cookies, pasta, soups and sauces, mayonnaise, salad dressings and the like which contain the product forms of the present invention as a colorant or an additive ingredient. Furthermore, fruit preparations used for dairy and cereals are also included.

The final concentration of the one or more fat-soluble active ingredients, preferred carotenoids, especially beta-carotene, which is added via the compositions of the present invention to the food products may preferably be from 0.1 to 50 ppm, particularly from 1 to 30 ppm, more preferred 3 to 20 ppm, e.g. about 6 ppm, based on the total weight of the food composition and depending on the particular food product to be colored or fortified and the intended grade of coloration or fortification.

The food compositions of this invention are preferably obtained by adding to a food product the fat-soluble active ingredient in the form of a composition of this invention. For coloration or fortification of a food or a pharmaceutical product a composition of this invention can be used according to methods per se known for the application of water dispersible solid product forms.

In general the composition may be added either as an aqueous stock solution, a dry powder mix or a pre-blend with other suitable food ingredients according to the specific application. Mixing can be done e.g. using a dry powder blender, a low shear mixer, a high-pressure homogenizer or a high shear mixer depending on the formulation of the final application. As will be readily apparent such technicalities are within the skill of the expert.

Pharmaceutical compositions such as tablets or capsules wherein the compositions of the present invention are used as a colorant are also within the scope of the present invention. The coloration of tablets can be accomplished by adding the compositions in form of a liquid or solid colorant composition separately to the tablet coating mixture or by adding the compositions to one of the components of the tablet coating mixture. Colored hard or soft-shell capsules can be prepared by incorporating the compositions in the aqueous solution of the capsule mass.

Pharmaceutical compositions such as tablets such as chewable tablets, effervescent tablets or film-coated tablets or capsules such as hard shell capsules wherein the compositions of the present invention are used as an active ingredient are also within the scope of the present invention. The product forms are typically added as powders to the tabletting mixture or filled into the capsules in a manner per se known for the production of capsules.

Animal feed products such as premixes of nutritional ingredients, compound feeds, milk replacers, liquid diets or feed preparations wherein the compositions are either used as a colorant for pigmentation e.g. for egg yolks, table poultry, broilers or aquatic animals or as an active ingredient are also within the scope of the present invention.

Cosmetics, toiletries and derma products i.e. skin and hair care products such as creams, lotions, baths, lipsticks, shampoos, conditioners, sprays or gels wherein the compositions of the present invention are used as a colorant or as an additive or as an active ingredient are also within the scope of the present invention.

The beverages and compositions of the present invention are those that show superior behavior in the test methods described below, in particular show an advantageous color hue.

Examples of beverages of the present invention are sports beverages, vitamin supplemented waters and beverages where the addition of vitamins is of interest. Also of interest are beverages used to restore electrolytes lost through diarrhea. Also of interest are carbonated beverages such as flavored seltzer waters, soft drinks or mineral drinks, as well as non-carbonated fruit and vegetable juices, punches and concentrated forms of these beverages.

The present invention further relates to a process for the manufacture of a beverage by mixing a composition as described above with further usual ingredients.

Further, the present invention relates to beverages obtainable by the process for the manufacture of a beverage as described above.

The compositions of the present invention are preferably additive compositions and are preferably used as additive compositions.

Physical Stability

An emulsion is considered to be physically stable if the distribution of the inner phase of the droplets is independent of time. Possible instabilities are creaming, sedimentation, Ostwald ripening, coalescence, phase inversion and aggregation.

Sedimentation and creaming are well known in the art, and have been extensively described in the literature using Stoke's Law. Rates of sedimentation and creaming are influenced by density, viscosity of the medium, particle size. For this reason measurement of particle size D(3,2) were realised to prove this invention. Additionally color change of some carotenoids formulations is a function of the D (3,2) value. e.g. for beta-carotene the smallest the droplets are, the most the color veers towards yellow.

The carotene emulsions according to step V) of the process for the manufacture according to the present invention show size ranges of from 0.05 μm to 1 μm (measurement realised with Mastersizer S).

The degree of flocculation in an emulsion depends also on electrokinetic forces. The stability of the all system depends on the balance between attractive and repulsive interactions between the droplets, for example, van der Waals, electrostatic, steric stabilisation. According to DLVO model, the positive primary maximum in the potential plot, serving as energy barrier against irreversible flocculation, should be >1.5kT (>37.5 mV) at room temperature. This electrostatic repulsion can be quantified by zeta potential, calculated from the electrophoretic mobility. Stability evaluations of our emulsions have been performed by measuring zeta potential using Smoluchowski equation. In our case, the zeta potential was always higher than −38 mV (measurement realised with Zetasizer Nano SZ).

For the application of color in industry, it is not only the measurement of color that is significant, but also the exact determination of color differences. CIE L*a*b* (CIELAB) is the most complete color space specified by the International Commission on Illumination (Commission Internationale d'Eclairage, hence its CIE initialism). It describes all the colors visible to the human eye and was created to serve as a device independent model to be used as a reference. The three coordinates of CIELAB represent the lightness of the color (L*, L*=0 yields black and L*=100 indicates white), its position between red/magenta and green (a*, negative values indicate green while positive values indicate magenta) and its position between yellow and blue (b*, negative values indicate blue and positive values indicate yellow). The asterisk (*) after L, a and b are part of the full name, since they represent L*, a* and b*, to distinguish them from Hunter's L, a and b. In our systems, a decrease of particle size coupled with a narrow size distribution is directly correlated with an increase of L*. Additionally, a decrease of particle size is translated as a color shift of product forms β-carotene based from reddish to yellowish. In our case, L* was always higher than 70 and b* positive.

The present invention is further illustrated by the following examples, which are not intended to be limiting.

EXAMPLE 1

On a beaker, gum ghatti was poured into water and stirred at room temperature until total dissolution of it. Meanwhile, the organic phase containing beta-carotene, corn oil, α-tocopherol were dissolved into solvent. Then, the organic phase was added to the aqueous phase and the resulting mixture emulsified (FLUID 5000 RPM). Finally, the solvent was evaporated under reduced pressure. The resulting product was converted into a dried form by powder catch (in a bed of starch). Particle size, color measurement and zeta potential of the product have been determined.

| Component | Amount (wt %) |
| --- | --- |
| Gum Ghatti | 56 |
| beta-Carotene | 6 |
| dl-α-Tocopherol | 1.8 |
| Cornoil | 6.2 |
| Starch | 30 |

EXAMPLE 2

In this example, gum ghatti and gum seyal have been poured into water and the system mixed until complete dissolution. Then food modified starch and maltodextrin were added and the resulting mixture stirred till complete dissolution. The experimental procedure is after this step, the same than the one described in example 1.

| Component | Amount (wt %) |
| --- | --- |
| Gum Seyal | 8.1 |
| Gum Ghatti | 33.3 |
| beta-Carotene | 4.7 |
| dl-α-Tocopherol | 1.4 |
| Cornoil | 5.1 |
| mod. starch | 8.7 |
| Maltodextrin | 8.7 |
| Starch | 30 |

EXAMPLE 3

On a reactor, gum ghatti was poured into water and stirred at room temperature until total dissolution. Meanwhile, the organic phase containing beta-carotene, corn oil, α-tocopherol were dissolved into solvent. The emulsification process was broken-up in two parts: first, realization of a premix (ESCO LABOR-25000 RPM), and then further emulsification on high pressure homogenizer. Finally, the solvent was evaporated under reduced pressure. The resulting product was converted into a dried form by powder catch (in a bed of starch). Particle size, β-carotene content, color measurement and zeta potential of the product have been determined.

| Component | Amount (wt %) |
| --- | --- |
| Gum Ghatti | 58.7 |
| beta-Carotene | 4.7 |
| dl-α-Tocopherol | 1.4 |
| Cornoil | 5.1 |
| Starch | 30 |

EXAMPLE 4

On a reactor, gum ghatti was poured into water and stirred at room temperature until total dissolution. Meanwhile, the organic phase containing beta-carotene, corn oil, α-tocopherol were dissolved into solvent. The emulsification process was broken-up in two parts: first, realization of a premix (ESCO LABOR-25000 RPM), and then further emulsification on high pressure homogenizer. Finally, the solvent was evaporated under reduced pressure. The resulting product was converted into a dried form by powder catch (in a bed of starch). Particle size, β-carotene content, colour measurement and zeta potential of the product have been determined.

| Component | Amount (wt %) |
| --- | --- |
| Gum Ghatti | 41 |
| beta-Carotene | 12 |
| dl-α-Tocopherol | 4 |
| Cornoil | 13 |
| Starch | 30 |

EXAMPLE 5

On a reactor, gum ghatti and maltodextrin were successively poured into water and stirred at room temperature until total dissolution. After, tocopheryl acetate previously warmed up to 60° C. was added to the aqueous phase. Then the resulting mixture was emulsified (FLUID 4000 RPM). Finally, the resulting product was converted into a dried form by spray drying. Particle size and tocopheryl acetate content of the emulsion have been determined.

| Component | Amount (wt %) |
| --- | --- |
| Gum Ghatti | 20 |
| DL-α-Tocopheryl acetate | 50 |
| Maltodextrin | 29 |
| Silicon dioxide | 1 |

EXAMPLE 6

On a reactor, gum ghatti and maltodextrin were successively poured into water and stirred at room temperature until total dissolution. Meanwhile, the Coenzyme Q 10 was dissolved into medium chain triglycerides at 60° C. The emulsification process was broken-up in two parts: first, realization of a premix ((FLUID 2000 RPM), and then further emulsification on high pressure homogenizer. The resulting product was converted into a dried form by powder catch (in a bed of starch). Particle size and coenzyme Q10 content of the product have been determined.

| Component | Amount (wt %) |
| --- | --- |
| Gum Ghatti | 30 |
| Coenzyme Q 10 | 11 |
| Maltodextrin | 30 |
| Medium chain triglycerides | 4 |
| Starch | 25 |

The invention claimed is:

1. A composition comprising dried particles of gum ghatti, gum acacia, and at least one fat-soluble active ingredient, wherein the composition comprises less than 40 weight-% oil, based on total dry composition weight.

2. The composition according to claim 1, wherein the fat-soluble active ingredient comprises at least one carotenoid.

3. The composition according to claim 2, which further comprises between 0.1 and 30 weight-% of at least one carotenoid, based on the total dry composition weight.

4. The composition according to claim 2, wherein the at least one carotenoid is beta-carotene.

5. The composition according to claim 1, which further comprises at least one modified starch.

6. The composition according to claim 5, wherein the modified starch is sodium octenyl succinate starch.

7. The composition according to claim 5, wherein the composition additionally comprises one or more oligosaccharides.

8. The composition according to claim 7, wherein the oligosaccharide is maltodextrin.

9. The composition of claim 2, wherein the carotenoid is at least one selected from the group consisting of beta-carotene, lycopene, lutein, bixin, astaxanthin, apocarotenal, beta-apo-8'-carotenal, beta-apo-12'-carotenal, canthaxanthin, cryptoxanthin, citranaxanthin and zeaxanthin.

10. A composition comprising dried particles of gum ghatti, at least one additional plant gum, at least one modified starch, and at least one fat-soluble active ingredient, wherein the composition comprises less than 40 weight-% oil, based on total dry composition weight.

11. The composition according to claim 10, wherein the fat-soluble active ingredient comprises at least one carotenoid.

12. The composition according to claim 11, which further comprises between 0.1 and 30 weight-% of at least one carotenoid, based on the total dry composition weight.

13. The composition according to claim 11, wherein the at least one carotenoid is beta-carotene.

14. The composition according to claim 10, wherein the modified starch is sodium octenyl succinate starch.

15. The composition according to claim 10, wherein the composition additionally comprises one or more oligosaccharides.

16. The composition according to claim 15, wherein the oligosaccharide is maltodextrin.

17. A food, animal feed, cosmetic or pharmaceutical composition which comprises the composition as claimed in claim 1 or 10.

18. A process for the manufacture of a composition as claimed in claim 1, which comprises the following steps:
 (I) forming an aqueous phase solution by dissolving gum ghatti and gum acacia and optionally one or more additional plant gums in water;
 (II) optionally adding at least one modified starch to the solution of step I);
 (III) adding to the aqueous phase an organic phase comprising at least one fat-soluble active ingredient and an oil in an amount of less than 40% by weight, based on the total dry composition weight, to form a mixture thereof;
 (IV) forming an emulsion by emulsifying the mixture of step (III) at a temperature of between 30° C. and 100° C.; and
 (V) drying the emulsion by spray-drying or powder catch drying.

19. The process as claimed in claim 18, wherein the fat soluble ingredient is a carotenoid, and wherein step (III) comprises adding an organic solvent to the solution.

20. The process as claimed in claim 19, which further comprises evaporating the organic solvent under reduced pressure prior to step (V).

21. The process according to claim 18, wherein step (II) comprises adding at least one oligosaccharide to the aqueous phase solution of step (I).

* * * * *